United States Patent [19]

Dufresne et al.

[11] Patent Number: 4,645,752
[45] Date of Patent: Feb. 24, 1987

[54] HYDROCRACKING CATALYST AND PROCESS FOR MANUFACTURING THE SAME

[75] Inventors: Pierre Dufresne, Rueil-Malmaison; Christian Marcilly, Houilles; Dinh Chan Trinh, Le Vesinet, all of France

[73] Assignee: Institut Francais du Petrole, Rueill-Malmaison, France

[21] Appl. No.: 748,809

[22] Filed: Jun. 25, 1985

[30] Foreign Application Priority Data

Jun. 25, 1984 [FR] France ................................ 84 10105

[51] Int. Cl.$^4$ .......................... B01J 29/12; B01J 29/22
[52] U.S. Cl. .......................................... 502/66; 502/74
[58] Field of Search .............................. 502/66, 74, 62

[56] References Cited

U.S. PATENT DOCUMENTS 3,399,132  8/1968  Mulaskey ............................. 208/111
3,607,728  9/1971  Wilhelm ............................. 502/79 X
3,986,948  10/1976  Rausch ................................. 208/139
4,079,092  3/1978  Hayes et al. ....................... 502/66 X
4,255,287  3/1981  Bertus et al. ........................... 502/62

Primary Examiner—Carl F. Dees
Attorney, Agent, or Firm—Millen & White

[57] ABSTRACT

The invention concerns a new catalyst containing (a) a zeolite carrier, (b) a metal from group VIII and (c) an additional metal selected from tin, germanium and lead, forming an alloy with the metal of group VIII, said additional metal being introduced as organic compound.

The catalyst can be used, in particular, in hydrocarbon hydrocracking reactions.

The figure of the accompanying drawing illustrates the conversion of n-heptane in the presence of a catalyst containing palladium and tin. Curve (A) illustrates this conversion at different temperatures, curves (B) and (C) giving the results after ageing of the catalyst.

14 Claims, 3 Drawing Figures

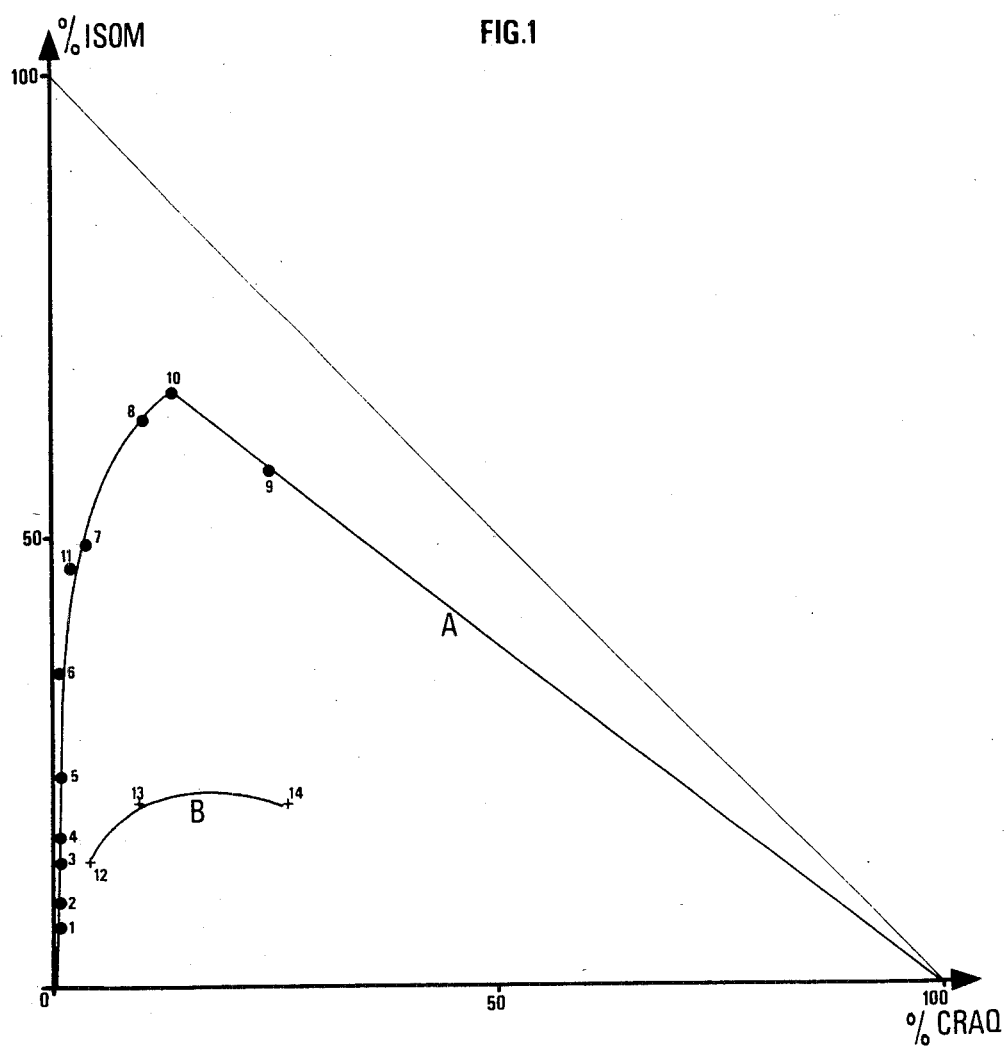

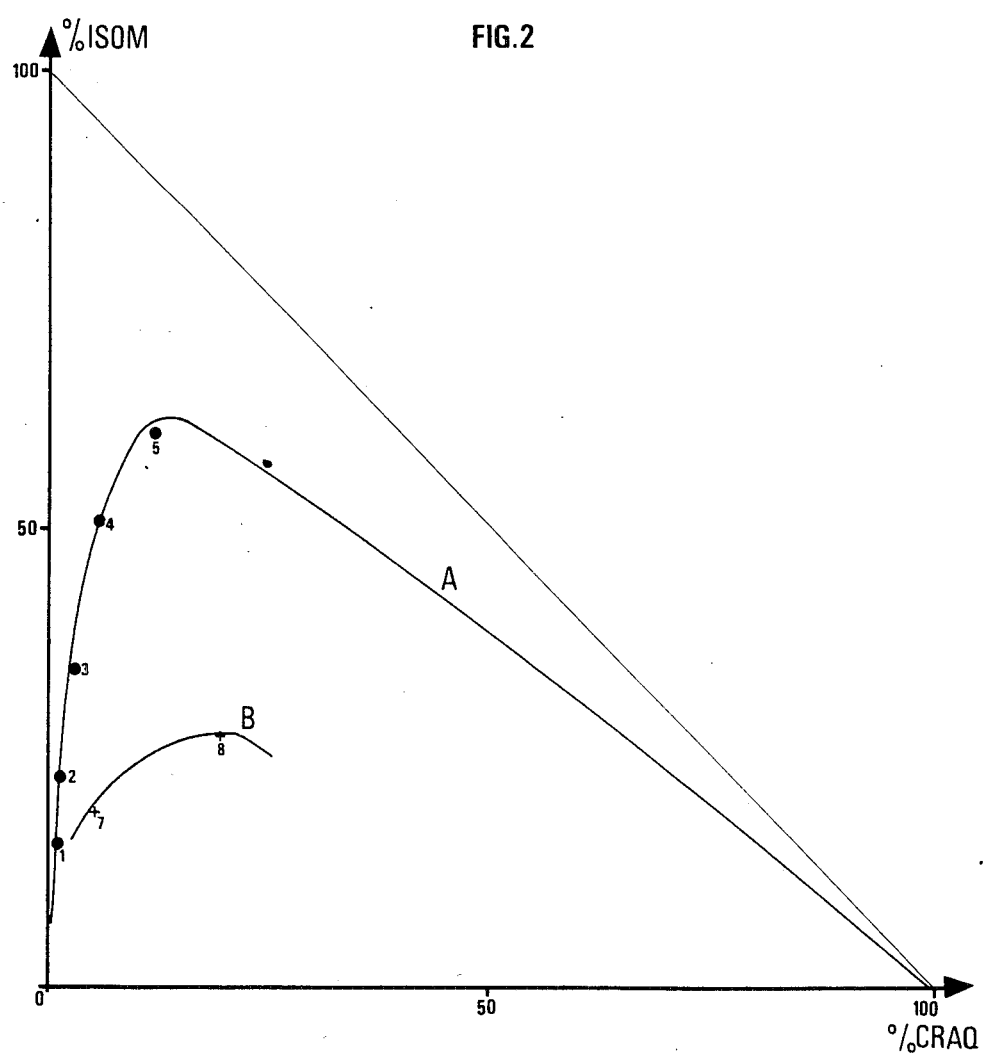

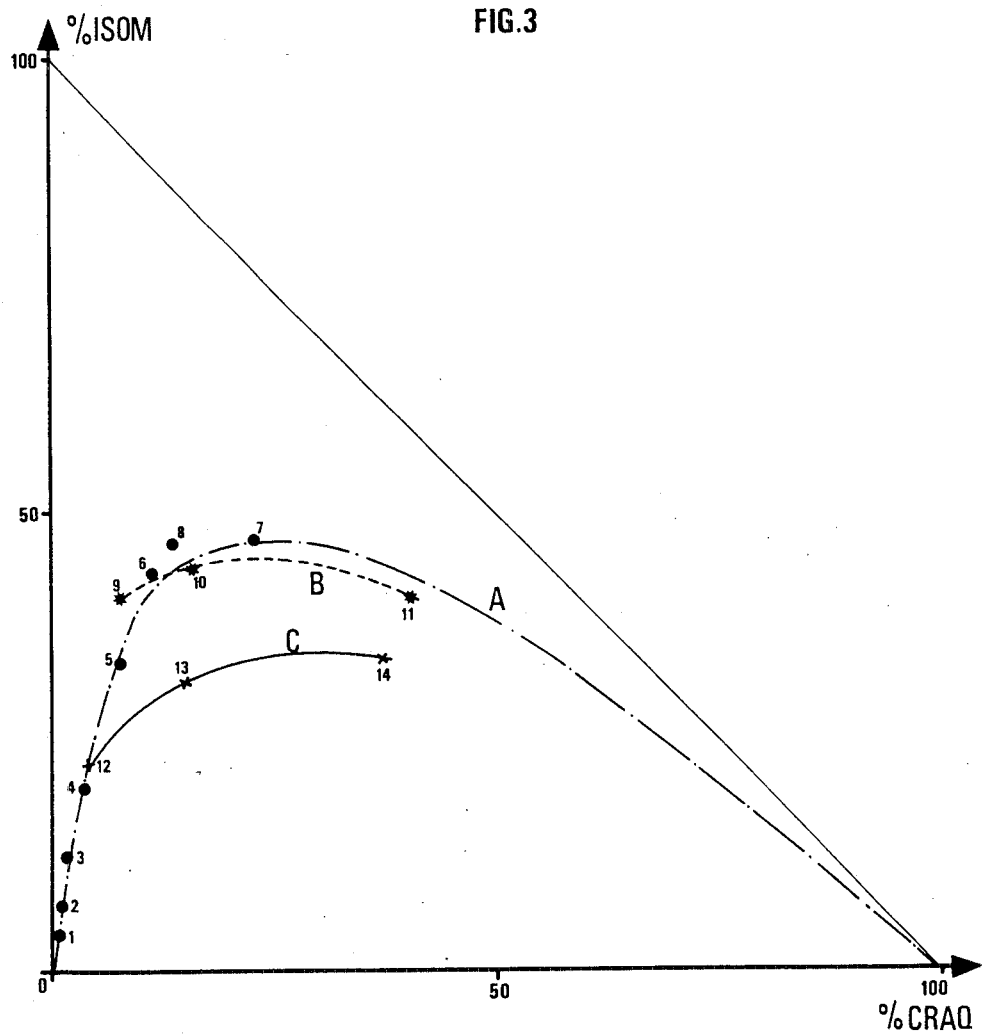

HYDROCRACKING CATALYST AND PROCESS FOR MANUFACTURING THE SAME

The present invention as an object the provision of a catalyst and a process for its manufacture said catalyst having a high isomerizing and cracking activity and an excellent resistance to deactivation. The invention also concerns the use of this catalyst in processes for hydrocarbons conversion requiring a catalyst of high hydrodehydrogenating function coupled with a cracking function and, more particularly, in hydrocracking processes. The catalyst phase according to the invention contains (a) a carrier, comprising at least one zeolite, (b) at least one noble or non-noble metal from group VIII of the periodic classification of elements and (c) at least one additional metal selected from the group consisting of tin, germanium and lead, the additional metal(s) being introduced on the carrier as at least one organic compound selected from the group consisting of alkyl, cycloalkyl, aryl, alkylaryl, arylalkyl metals of tin, germanium and lead and the halogenated derivatives of said organic compounds.

The present invention also concerns a process for hydrocracking oil substances in the presence of a catalyst according to the invention, consisting of an acid carrier and a particular bimetallic phase.

In hydrocracking reaction, the bifunctional catalysts (having both an acid function and a hydro-dehydrogenating function) are used to selectively promote hydrogenation, isomerization and cracking of high molecular weight products, to produce lighter an more valuable effluents.

BACKGROUND OF THE INVENTION

It is known that catalysts of palladium on zeolite are active in hydrocracking, the acid function being obtained by the acid sites of the zeolite, the hydrogenating function by the metal. This catalyst has a very good initial activity with charges not overly contaminated by nitrogen or sulfur molecules, at temperatures as low as about 320° C. However, rapid deactivation requires increasing the temperature, particularly if the pressure is lower and the charge more contaminated with sulfur and nitrogen. From thermal levels about 380°-400° C., the palladium catalyst deactivates very quickly and its property of good hydrogenating function disappear. This quick deactivation is partially due to the sintering of the metal phase. As a matter of fact, palladium crystallites, at high temperature (above 380°-400° C.) and in the presence of sulfur- and nitrogen-containing organic compounds, tend easily to couple with one another and form large particles; the metal active surface then becomes very small and the catalyst can no longer assume its action of promoting bifunctional reactions.

The other main cause of deactivation is the coking of the catalyst. Coking is a phenomenon according to which a catalyst is progressively covered with polycondensed molecules which block the access to the active sites.

SUMMARY OF THE INVENTION

The invention has as one object the provision of a catalyst composition of particular formula as well as the hydrocracking of hydrocarbon charges in the presence of this particular catalyst composition. This catalyst comprises an acid carrier, containing at least one zeolite, whereon is deposited a metal combination containing, on the one hand, at least one noble or non-noble metal from group VIII, the one or more metal(s) being selected from the group consisting of platinum and (mainly) palladium and, on the other hand, at least one metal element from group IV A selected from tin, germanium and lead.

The present invention also concerns a particular method for preparing said metal combination, whereby a new type of product is obtained.

Mixed phases of an element from group VIII and an element from group IV A have already been disclosed in patents in the hydrocracking field. Examples of such patents are U.S. Pat. Nos. 3,399,132, 3,979,727 and 3,986,948.

However tin is always introduced as salts such as chlorides, (bromides, acetate, sulfate, tartarate, etc . . . ); similarly, germanium and lead are introduced, for example, as halides, optionally in non-aqueous solvent, or as other equivalent salts.

One of the more usual methods for introducing the metal from group IVA is the co-mixing of an adequate salt with the carrier. This method, easy to perform, provides for a juxtaposition of the metal elements without real combination between the metal elements. Two other current methods suffer from the same defect: dry impregnation and cationic exchange. The latter is, in addition, difficult to conduct with elements from group IV A, since the corresponding cations are hydrolyzable.

A new method has been discovered for introducing the additional metal, i.e. tin, germanium or lead, on a zeolite-containing carrier on which the metal precursor from group VIII has already been deposited. This method would provide for a real association of the two metals with the formation, at least partial, of a highly dispersed alloy; as a matter of fact, the group IV A metal precursor combines, by chemical reaction, with the phase of the first metal already fixed on the carrier, so that it can be assumed that at least partial intimate contact is achieved between the two metals.

The additional metal (tin, germanium or lead) is introduced as at least one organic compound selected from the group consisting of alkyl, cycloalkyl, aryl, alkylaryl or arylalkyl metals of tin, germanium or lead and the halogenated derivatives of the preceding organic compounds. Examples of preferred compounds are tetrabutyl tin, tetramethyl tin, tetrapropyl germanium, tetraethyl lead, diphenyl tin.

The impregnation solvent for these organic compounds, is selected from the group consisting preferably of paraffinic, naphthenic or aromatic hydrocarbons containing 6 to 12 carbon atoms per molecule; examples are n-heptane, methylcyclohexane, toluene.

The catalysts prepared according to the invention preferably contain, by weight with respect to the carrier:

- 0.01 to 10% of at least one metal from group VIII. Preferably palladium or platinum are used. The preferred amounts are from 0.1 to 1.5% of palladium and from 0.1 to 1% of platinum.
- 0.005 to 10% and preferably 0.008 to 4% of metal from group IV A. The atomic ratios between the one or more metals from group IV A and the one or more metals from group VIII are preferably from 0.05 to 2.

These catalysts may contain a halogen, but this element being not necessary to obtain a good catalytic hydrocracking, they preferably contain no halogen.

The carrier contains at least one zeolite having more intense acid properties than, for example, the amorphous silica-aluminas.

The carrier may contain, by weight, preferably from 5 to 95% of zeolite, more particularly from 20 to 80%. The upper limit of this proportion is imposed by the required mechanical strength of the final catalyst; it must be resistant to crushing and to attrition so as to avoid formation of fine particles which would be liable to progressively obstruct the catalyst bed in the reactor. This requirement obliges shaping the zeolite (as extrudates, balls, pellets etc . . . ) with a binder according to techniques known in the prior art. This binder may be alumina, silica, magnesia, boron-alumina, zirconia and combinations of of these different oxides, as silica-alumina or silica-magnesia, as well as natural clays.

The zeolite is selected from the following structures: faujasite (zeolite of X or Y type), mordenite, ZSM 5, ZSM 11, omega, offretite, erionite, T erionite, ferrierite, clinoptilolite chabazite. The preferred zeolites for hydrocracking are those having wide pore openings, a lattice of very open channels, a high thermal stability; examples are zeolites of the Y faujasite structure, stabilized by addition of cations (rare earths, magnesium etc . . . ) or by hydrothermal treatment. These zeolites must be free of the essential part of their alkali or alkaline-earth cations, for having acid properties.

Zeolites may be stabilized or made partially free of their aluminum. In particular, for Y faujasite, the crystalline parameter of the mesh can range from $24.2 \cdot 10^{-10}$ m to $24.6 \cdot 10^{-10}$ m.

The preparation of the zeolite carrier and the introduction of palladium (preferred metal from group VIII) or platinum, are conventional in the art. A typical method for preparing a palladium or platinum catalyst is given hereinafter. Six preparation steps are involved:

(1) replacement of the major part of sodium of the zeolite by ammonium ions and/or ions of metals from the group of alkaline earth metals (mainly Ca, Mg) or rare earth metals, (2) introduction by ionic exchange of a metal (mainly Pd or Pt) for example as an aminated complex of $Cl_2Pd(NH_3)_4$ or $Cl_2Pt(NH_3)_4$ type, at pH values from about 2 to 11, (3) stabilization of the zeolite by roasting at high temperature (300° to 800° C.) in the presence of large steam amounts ($H_2O$ partial pressure of $10^4$ Pascal) or in the presence of an anhydrous gaseous inorganic acid such as, for example, HCl: examples of relevant patents are U.S. Pat. Nos. 3,354,077; 3,926,780; 4,036,739; 3,506,400; 3,591,488 relating to the use of steam and French Pat. Nos. 2,303,764 and 2,303,765 for the use of anhydrous gaseous acid, (4) shaping of the catalyst, i.e. after admixture with a hydrated or anhydrous inorganic oxide, such as hydrated alumina, for example, (5) drying and final roasting of the catalyst.

The above-listed five steps may form sequences in orders different from the 1-2-3-4-5 order. Thus, for example, the 1-3-2-4-5 or 1-3-4-2-5 orders can be chosen.

After the last thermal treatment, the last step (sixth step) consists of introducing tin or germanium or lead according to the already described method according to the invention. This impregnation step must be followed with solvent desorption, preferably in inert gas.

The catalyst is generally activated in hydrogen before the catalytic reaction.

The so-prepared catalysts have advantageous properties in hydrocracking reactions, which are generally conducted at a temperature ranging from 250° to 350° C. and under a pressure from 0.8 to 25 MPa. The liquid hourly space velocity (LHSV) or volume per hour of liquid charge, at 15° C., per volume of catalyst is about from 0.1 to 10, preferably with an upper limit of about 4, and the hydrogen flow rate is from 1 to 25 moles/mole of charge. These catalysts, used alone or as mixture with for example, at least one other constituent selected from the group of carriers or matrices and metals or metalloids, are also convenient for the catalysis of hydrocarbons catalytic cracking reactions.

EXAMPLES

The following examples illustrate the present invention without however limiting in any way the scope thereof.

EXAMPLE 1

Preparation of a catalyst A (reference monometallic catalyst)

A catalyst whose carrier contains 50% by weight of stabilized Y zeolite and 50% by weight of alumina, and which further contains 0.48% by weight of palladium, is prepared as follows:

three successive cationic exchanges in 2M solutions of ammonium nitrate are used to decrease the sodium content of NaY zeolite from 9.7 to 2.1% by weight.

this exchanged zeolite is mixed with an alumina powder previously peptized with nitric acid. The mixture is then extruded through a drawing plate of 1.4 mm diameter, the extrudates are dried in ventilated stove at 130° C., then roasted in a dry air stream up to 400° C. and a moist air stream (70% steam) from 400° to 530° C. This operation gives to the extrudates the mechanical strength and decreases the crystalline parameter of the zeolite elementary mesh.

the extrudates of the 50–50% by weight alumina-zeolite mixture are then contacted with a tetramine palladium nitrate solution containing 0.6% by weight of palladium with respect to the extrudates weight. This solution also contains a competing salt: ammonium nitrate. The palladium content is 0.48% by weight and the sodium content 0.17% by weight with respect to the catalyst carrier, the catalyst is dried at 120° C. and then roasted at 500° C. for 6 hours.

EXAMPLE 2

Preparation of a catalyst B (bimetallic catalyst according to the technique of this invention)

Catalyst A is dipped into a benzene solution containing 0.3% by weight of tin, in proportion to the solid, as tetrabutyl tin. After 2 hours of reflux, the solution is filtered and the product stripped under nitrogen at 200° C. The tin content is 0.32% by weight with respect to the catalyst carrier, the palladium and sodium contents being the same as in catalyst A.

EXAMPLE 3

Preparation of a catalyst C (bimetallic catalyst according to the prior art technique)

Alumina powder is mixed with a tin acetate acid solution; a NaY zeolite is then introduced and the mixture is extruded.

After roasting, palladium is introduced; the catalyst finally contains 0.48% by weight of palladium and 0.3% by weight of tin, in proportion to the catalyst carrier.

EXAMPLE 4

Preparation of a catalyst D (preparation of a bimetallic catalyst according to the technique of the invention-Magnesium zeolite)

NaY zeolite is exchanged with ammonium nitrate, then with magnesium nitrate, so as to contain 3.9% by weight of MgO; it is then admixed with alumina in 80/20 proportion. The paste is extruded and roasting is performed at 500° C. Then 0.4% palladium (as palladium tetrammine chloride) and 0.21% tin (as tetramethyl tin) are introduced.

EXAMPLE 5

Preparation of a catalyst E (bimetallic catalyst according to the technique of the invention)

A NaY zeolite is exchanged several times with ammonium sulfate solutions, then stabilized by treatment at 780° C. in static atmosphere, then treated with a 1M ammonium sulfate solution and a 1M hydrochloric acid solution. The zeolite has then a crystalline mesh parameter of 24.33 $10^{-10}$ m, a sodium content of 0.10% and a molar ratio $SiO_2/Al_2O_3$ of 15.3. Palladium is then introduced by means of a solution of palladium chloride in ammonia. After washing with water and drying at 200° C., tin is introduced by means of a solution of tetrabutyl tin in toluene. Finally the product is mixed with 50% of peptized alumina, then extruded and roasted at 480° C. The Pt and Sn contents of the final catalyst are respectively 0.31 and 0.22%.

EXAMPLE 6

Selectivity and stability test of monometallic catalyst A in n-heptane conversion (comparative)

Catalyst A is fed to a unit of the catatest type and then activated in hydrogen at 400° C., 4 MPa at a flow rate of 5 liters per hour, per gram of catalyst; after cooling at 240° C., the pressure is increased to 6 MPa and injection of n-heptane begins at a hourly volume velocity of 3 and a molar ratio hydrogen/hydrocarbon of 6.

The results are shown in FIG. 1, where the molar percent of cracked n-heptane is indicated on the abscissa and the molar percent of isomerized n-heptane on the ordinate. The temperature is progressively increased to vary the conversions to isomerized product and to cracked product and thus to estimate the catalyst selectivity. A curve (A) is obtained giving points 1 to 9 and then two "return" points 10 and 11. At the end of the test, the product is subjected to ageing for 8 hours at a temperature of 450° C. under the same pressure and flow conditions. At said temperature the conversion to cracked products is 100%. Then points 12 to 14 (curve B) are determined in the same conditions as precedingly.

The different determined points are as follows:

| Points | 1 | 2 | 3 | 4 | 5 | 6 | 7 | 8 | 9 | 10 | 11 | Ageing (8 hours) | 12 | 13 | 14 |
|---|---|---|---|---|---|---|---|---|---|---|---|---|---|---|---|
| Temperatures (°C.) | 230 | 235 | 240 | 245 | 250 | 260 | 270 | 280 | 290 | 285 (return) | 270 (return) | 450°C. | 290 | 300 | 310 |

FIG. 1 shows that, at a temperature lower than 280° C., the fresh catalyst is very selective for isomerization. However, this selectivity is lost after artificial ageing at 450° C. In fact, the hydrogenating action of the catalyst, excellent when the catalyst operates at about 290° C., becomes very bad after ageing at 450° C.

EXAMPLE 7

Test of catalyst C (comparative example)

The same test procedure is applied to catalyst C. FIG. 2 shows the variation of the yields to isomerized and cracked products versus temperature. A curve (A) is drawn giving points 1 to 6. Then an ageing for 8 hours at 450° C., under the same pressure and flow conditions, is performed. Then, in the same conditions as precedingly, two points 7 and 8 (curve B) are determined at 290° and 310° C.

| Points | 1 | 2 | 3 | 4 | 5 | 6 | Ageing (8 hours) | 7 | 8 |
|---|---|---|---|---|---|---|---|---|---|
| Temperatures (°C.) | 240 | 250 | 260 | 270 | 280 | 290 | 450 | 290 | 310 |

In conclusion, this bimetallic catalyst C, prepared according to a known technique of the prior art, does not withstand the treatment at 450° C.

EXAMPLE 8

Test of catalyst B

A procedure similar to that of tests of examples 6 and 7 is applied to catalyst B. FIG. 3 reports the results of the test which was conducted as follows:

7 points 1 to 7 (curve A) are determined with a progressive temperature increase from 230° to 290° C., to show the variations of the conversions to isomerized and cracked products and thus estimate the selectivity of the catalyst. Then return point B is determined. At the end of this test, a first catalyst ageing for 8 hours at 450° C. is performed under the same pressure and flow conditions as precedingly.

As this temperature, the conversion to cracked products is 100%; then, (curve B), points 9, 10 and 11 are determined in the same conditions as precedingly, with respective temperatures of 290° C., 300° C. and 310° C.

Then a second ageing is performed for 8 hours at 500° C. instead of 450° C. and new points 12, 13 and 14, corresponding to respective temperatures of 280° C., 290° C. and 300° C., are determined in the same conditions as precedingly (curve C).

| Point | 1 | 2 | 3 | 4 | 5 | 6 | 7 | Ageing (8 hours) | | 9 | 10 | 11 | Ageing (8 hours) | 12 | 13 | 14 |
|---|---|---|---|---|---|---|---|---|---|---|---|---|---|---|---|---|
| Temperature (°C.) | 230 | 240 | 250 | 260 | 270 | 280 | 290 | 285 (return point) | 450 | 290 | 300 | 310 | 500 | 280 | 290 | 300 |

The catalyst has a good stability since its selectivity is not modified by ageing at 450° C., which means that the hydrogenating function of this catalyst remains substantially unchanged inasmuch as the second ageing of the catalyst at 500° C. affects catalyst B to a less extent than a single ageing at 450° C. affects catalysts A and B. The new bimetallic phase palladium/tin is hence very resistant to deactivation.

EXAMPLE 9

Test of catalysts A, D, E on gas-oil

Catalysts A, D and E are estimated in the hydrocracking of a hydrotreated gas-oil having the following characteristics:
Initial point: 303° C.
Final point: 480° C.
Density (20° C.): 0.850
S content: 1300 ppm
N content: 110 ppm
The hydrocracking conditions are as follows:
Pressure: 12 MPa
VVH: 3
$H_2$/HC: 1,000 l/l

CATALYST A (with only palladium as active metal) (comparative)

After 100 hours of run at 385° C., the conversion to 320− is 78%, which corresponds to a density of 0.755. After 300 hours of run, the conversion is only 67%. The temperature must be increased by 10° C. (to 395° C.) in order to obtain a conversion rate close to 80%. The aromatics/naphthenes ratio in the 80–150 cut is 0.16.

CATALYST D (conforming with the invention)

Catalyst D is used for 300 hours at 385° C. The liquid effluent density is 0.777 and the total conversion to 320− is 80%. It is more active than catalyst A, produces less gas and selective for gasoline and middle distillates, as a result of the quality of its hydrogenating action. The cumulated yields of the different cuts are as follows:

| Initial point-27 (°C.) | 11% by volume |
|---|---|
| after 27–80 cut | 42% " |
| after 80–150 cut | 68% " |
| after 150–320 cut | 79% " |
| after 320–Final point cut | 100% " |

Finally, the aromatics/naphthenes ratio in the 80–150 cut is 0.23. This shows that bimetallic catalyst D behaves as a selective hydrogenation catalyst and maintains a higher content of aromatics in the gasoline, thus improving the quality of this product. Catalyst D is, moreover, very stable.

CATALYST E (conforming with the invention)

The aim was to obtain a 80% conversion to 320− products. After 300 hours, the temperature at which this conversion can be achieved is 385° C. and the cumulated yields of the different cuts are:

| Initial point-27 (°C.) | 8% by volume |
|---|---|
| after 27–80 cut | 30% " |
| after 80–150 cut | 57% " |
| after 150–320 cut | 80% " |
| after 320–final point | 100% " |

This catalyst thus shows an excellent selectivity for middle distillates as a result, on the one hand, of its good hydrogenating action and, on the other hand, of its acid function which has been reduced by the zeolite stabilization and aluminum removal treatments.

What is claimed as this invention is:

1. In a catalyst containing (a) a carrier comprising at least one zeolite, (b) at least one noble or non-noble metal from group VIII of the periodic classification of elements, and (c) at least one additional metal selected from the group consisting of tin, germanium and lead, the improvement wherein said additional metal is introduced on the carrier as at least one organic compound selected from the group consisting of alkyl, cycloalkyl, aryl, alkylaryl, arylalkyl metals of tin, germanium and lead and the halogenated derivatives of said organic compounds.

2. A catalyst according to claim 1, wherein the additional metal is introduced in the catalyst carrier as a as a compound selected from the group consisting of tetrabutyl tin, tetraethyl tin, tetrapropyl germanium, tetraethyl lead and diphenyl tin.

3. A catalyst according to claim 2, wherein tin is introduced in the catalyst carrier as a compound selected from the group consisting of tetrabutyl tin, tetraethyl tin and diphenyl tin.

4. In a catalyst containing (a) a carrier comprising at least one at least one zeolite, (b) at least one noble or non-noble metal from group VIII of the periodic classification of elements, and (c) at least one additional metal selected from the group consisting of tin and germanium,
the improvement wherein said additional metal is introduced on the carrier as at least one organic compound selected from the group consisting of alkyl, cycloalkyl, aryl, alkylaryl, arylalkyl compounds of tin and germanium and the halogenated derivatives of said organic compounds.

5. In a catalyst containing (a) a carrier comprising at least one at least one zeolite, (b) at least one noble or non-noble metal from group VIII of the periodic classification of elements, and (c) at least one additional metal which is tin, the improvement wherein said additional metal is introduced on the carrier as at least one organic compound selected from the group consisting of alkyl, cycloalkyl, aryl, alkylaryl, arylalkyl compounds of tin and the halogenated derivatives of said organic compounds.

6. A catalyst according to claim 5, containing, by weight in proportion to the carrier, 0.01 to 10% of at least one metal from group VIII and 0.005 to 10% of at least one additional metal, the atomic ratio between the additional metal and the metal from the group VIII ranging from 0.05 to 2.

7. A catalyst according to claim 6, containing, by weight in proportion to the carrier, 0.1 to 1% of platinum or 0.1 to 1.5% of palladium and 0.008 to 4% of at least one additional metal.

8. A catalyst according to claim 5, wherein the carrier contains 5 to 95% by weight of zeolite.

9. A catalyst according to claim 8, wherein the carrier contains 20 to 80% of zeolite.

10. A catalyst according to claim 5, containing (a) a carrier comprising an Y zeolite, (b) palladium and (c) tin.

11. A catalyst according to claim 6, wherein the additional metal is introduced in the catalyst carrier as a compound selected from the group consisting of tetrabutyl tin, tetraethyl tin, and diphenyl tin.

12. A catalyst according to claim 7, wherein the additional metal is introduced in the catalyst carrier as a compound selected from the group consisting of tetrabutyl tin, tetraethyl tin, and diphenyl tin.

13. A catalyst according to claim 8, wherein the additional metal is introduced in the catalyst carrier as a compound selected from the group consisting of tetrabutyl tin, tetraethyl tin, and diphenyl tin.

14. A catalyst according to claim 9, wherein the additional metal is introduced in the catalyst carrier as a compound selected from the group consisting of tetrabutyl tin, tetraethyl tin, and diphenyl tin.

* * * * *